Oct. 29, 1963

M. C. VANCE 3,108,691

SIZING MACHINE

Filed Jan. 26, 1961

Merton C. Vance
INVENTOR.

BY *Clarence A. O'Brien*
*and Harvey B. Jacobson*
Attorneys

Merton C. Vance
INVENTOR.

Oct. 29, 1963
M. C. VANCE
3,108,691
SIZING MACHINE
Filed Jan. 26, 1961
6 Sheets-Sheet 4
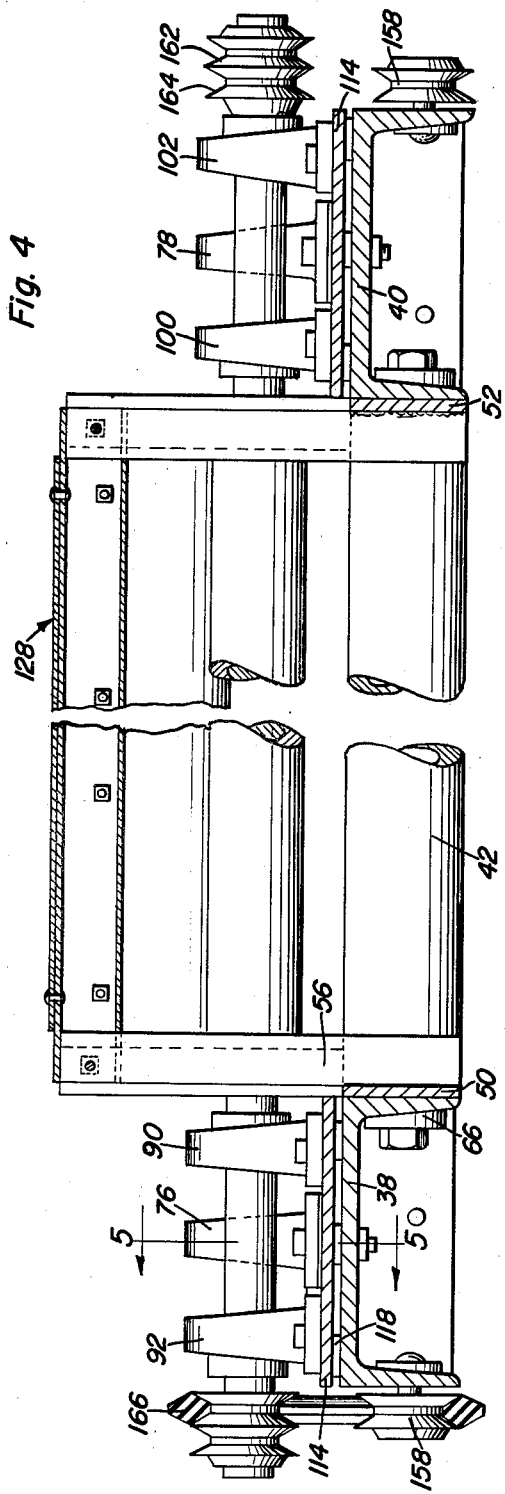
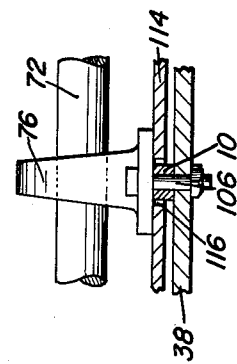
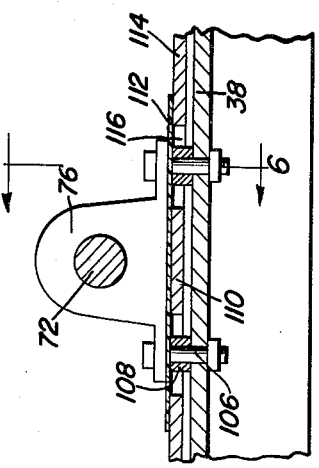
Merton C. Vance
INVENTOR.

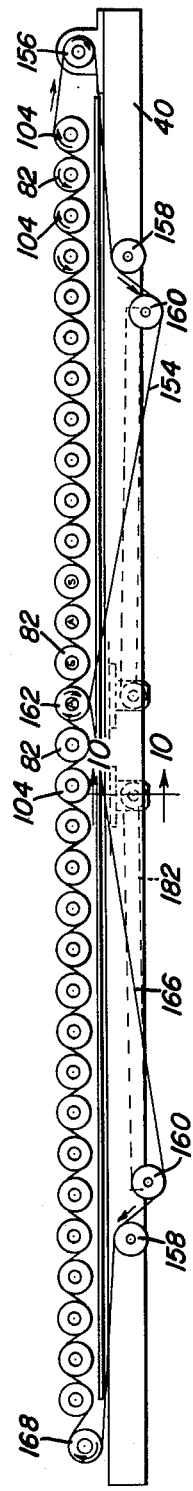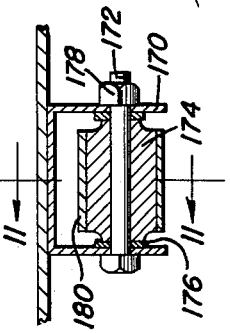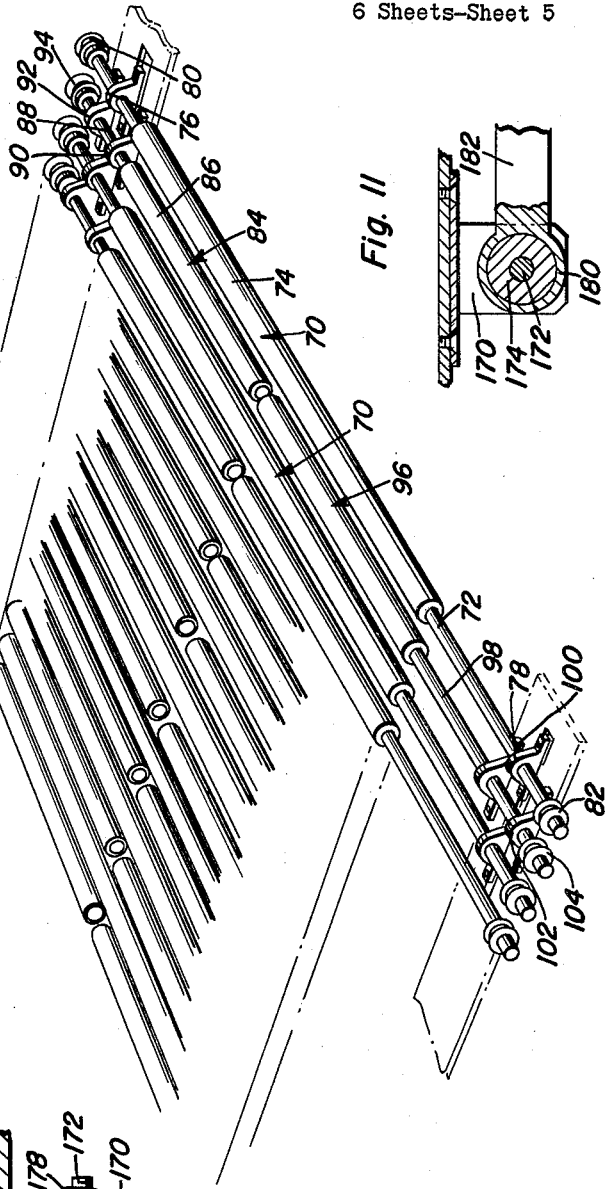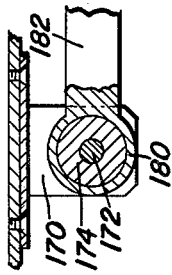

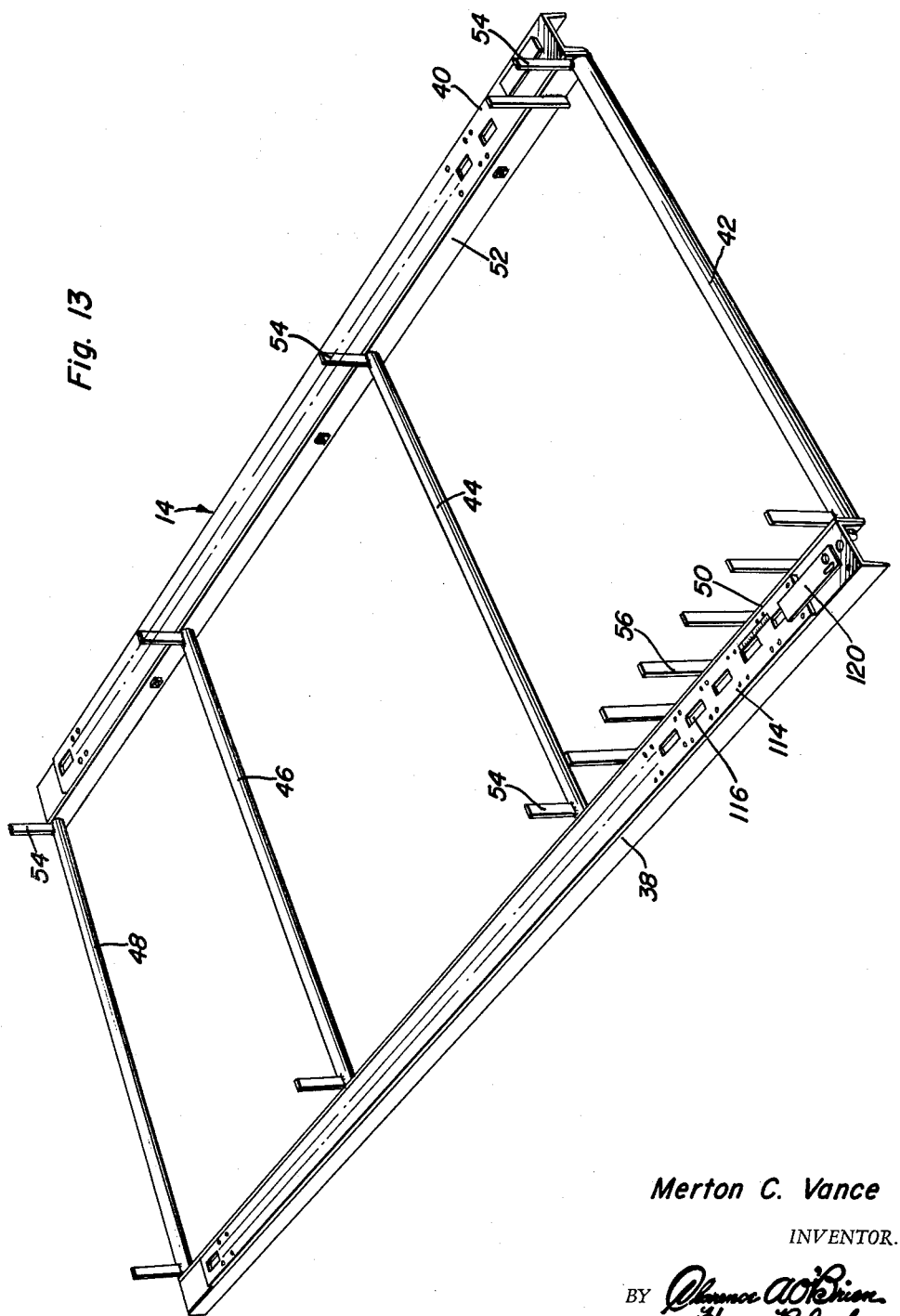

3,108,691
SIZING MACHINE
Merton C. Vance, Grandview, Wash., assignor to Prosser Packers, Inc., Prosser, Wash., a corporation of Washington
Filed Jan. 26, 1961, Ser. No. 85,047
5 Claims. (Cl. 209—107)

This invention relates to a machine which receives fruit, vegetables or other such products and separates the items into size categories.

One of the important operations in the handling of fruit and vegetables or the like for merchandising purposes or for the selection of those fruits or vegetables suitable for canning or other processing, involves the sizing of the food products within certain size categories or size ranges as for example small, medium and large. Accordingly, the present invention is concerned with a machine for accomplishing the sizing operation in a most efficient, rapid manner and with little damage to the food products. It is therefore a primary object of this invention to provide a sizing machine which has been especially designed for the sizing of asparagus but which is also useful for various other types of fruits and vegetables.

An important object of this invention therefore, is to provide a sizing machine which will separate the fruit or vegetables passing thereover into small, medium and large size categories and wherein the size range of the size categories may be infinitely varied with great accuracy by virtue of a novel adjustment feature of the sizing machine. As a result thereof, great flexibility in the choice of sizes is provided rendering the sizing machine more widely useful.

An additional object of the invention is to provide a sizing machine in which the size categories may be independently adjusted during operation of the machine if so desired and with considerable ease.

Another object of this invention is to provide a sizing machine which by virtue of its novel and advantageous construction eliminates the need for frequent adjustments and which machine requires less maintenance and repair.

A still further object of this invention is to provide a sizing machine which operates with greater reliability, less wear and noise.

The sizing machine made in accordance with the foregoing objects, involves a main frame assembly which is supported on an adjustable base assembly at a downward inclined angle so that the fruit or vegetables which may be channeled thereonto from a shaker and divider mechanism will tumble downwardly on a plurality of flexible wall channels below which oppositely rotating sizing rollers which are spaced apart maintain the fruit or vegetable tumbling until the fruit or vegetable falls between the sizing rollers when the spacing therebetween exceeds the size of the fruit or vegetable. Accordingly, as the food products move downwardly along the channels they will drop onto delivery conveyors or bins in accordance with the size thereof. The spacing between the sizing rollers increases in steps as the products move downwardly along the incline of the frame, the spacing between the sizing rollers for each step being independently adjustable so as to vary the choice of sizes. The adjustment of the sizing rollers and the drive therefor as well as the cooperation with the flexible wall channels account for the advantageous operation of the sizing machine as hereinbefore mentioned and also represents the novel arrangements of the sizing machine constituting a purposeful departure from sizing machines heretofore available.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a sectional view taken substantially through a plane indicated by section line 4—4 in FIGURE 3.

FIGURE 5 is a partial sectional view taken through a plane indicated by section line 5—5 in FIGURE 4.

FIGURE 6 is a partial sectional view taken through a plane indicated by section line 6—6 in FIGURE 5.

FIGURE 9 is a schematic end view of the drive mechanism for the sizing machine.

FIGURE 10 is a sectional view taken substantially through a plane indicated by section line 10—10 in FIGURE 9.

FIGURE 11 is a partial sectional view taken substantially through a plane indicated by section line 11—11 in FIGURE 10.

FIGURE 12 is a partial perspective view of the sizing roller assemblies of the sizing machine.

FIGURE 13 is a partial perspective view of the main frame assembly of the sizing machine.

Figure 1:
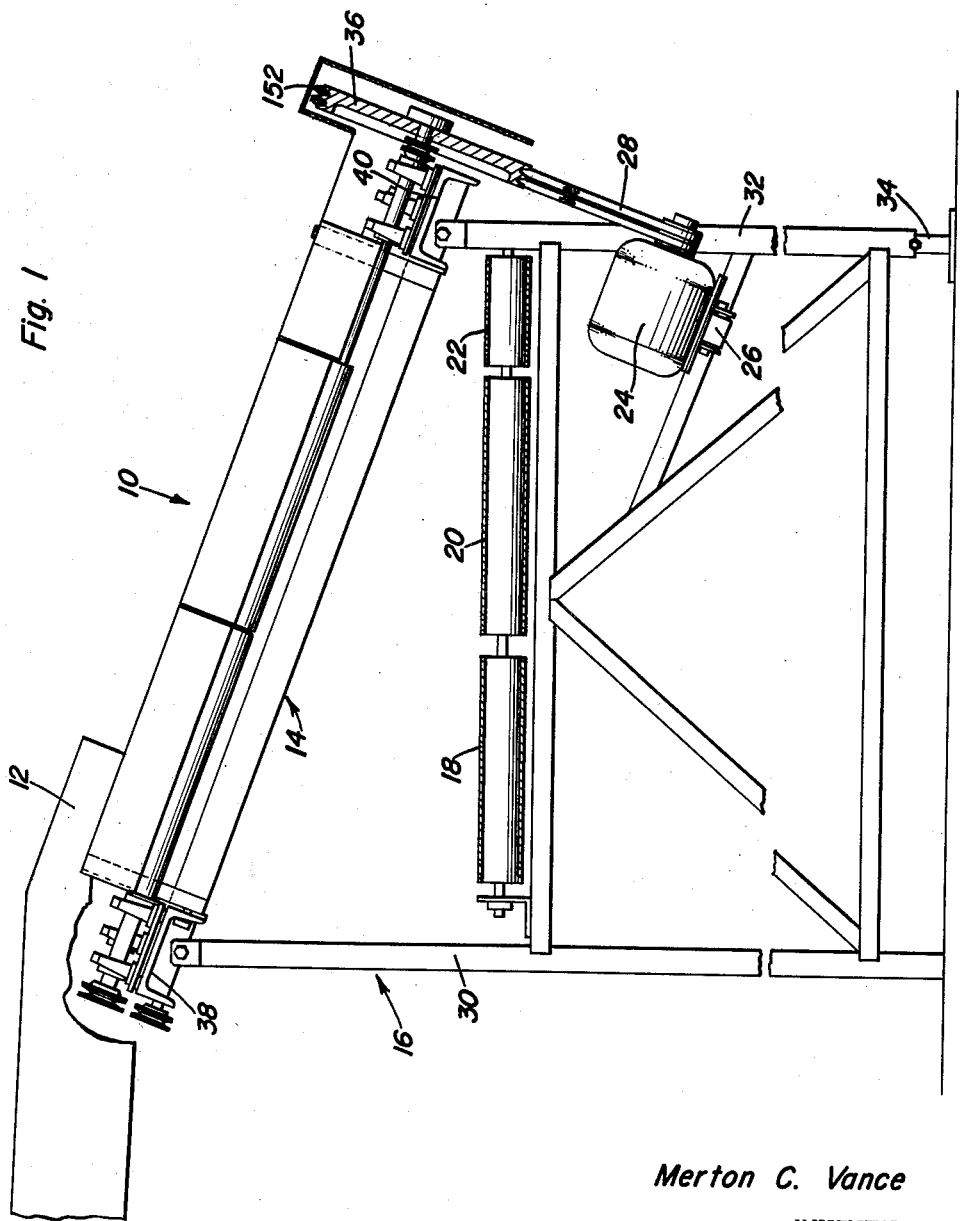
FIGURE 1 is a side elevational view with parts broken away, of the sizing machine.

Referring now to the drawings in detail, the sizing machine which is generally referred to by reference numeral 10 is shown in FIGURE 1 in operative position associated with the outlet end of a divider and shaker mechanism 12 from which the food products being sized are delivered onto the sizing machine. It will therefore be noted that the shaker and divider mechanism 12 overlies an upper end of a downwardly inclined main frame assembly 14 of the sizing machine which is adjustably supported by a base assembly 16. The food products being sized by the machine 10 as they pass downwardly on top of the main frame assembly 14, drop at different points as they move downwardly along the main frame portion 14 in accordance with the size thereof for reception on delivery conveyors 18, 20 and 22 which may be respectively classified as small, medium and large. It should be understood of course, that the base assembly 16 may alternatively mount collection bins for receiving the sized food products. Also mounted by the base assembly 16 adjacent to the lower end of the main frame assembly 14, is a motive power source 24 in the form of an electric motor mounted by a suitable torsion belt tensioning mechanism 26 for imparting drive to the sizing machine through the belt mechanism 28. It will be apparent, that the base assembly may be made of any suitable construction for support of the main frame assembly 14 and for support of the sized product receiving conveyors or bins and for the power source 24. It is only essential, that the base assembly 16 support the main frame assembly 14 at the proper inclination and hence is illustrated as including vertical posts 30 supporting the main frame assembly at the upper end and adjustable posts 32 connected to the lower end of the main frame assembly and adjustably spaced above the floor by adjustable pipe legs 34. The motor 24 also, will be supported by the base assembly 16 and disposed at an angle parallel to the inclination of the main frame assembly 14 so that the drive belt mechanism 28 may properly drivingly connect the motor 24 to the drive pulley 36 through which the sizing machine is powered.

Referring now to FIGURE 13 in particular, it will be observed that the main frame assembly 14 disclosed therein is composed of an upper channel member 38 arranged parallel to a lower channel member 40 and interconnected therewith by a plurality of spacer pipe members 42, 44, 46 and 48. Interposed between each of the channel members 38 and 40 and the spacer pipes, are elongated plate members 50 and 52 suitably secured to the facing sides of the channel members 38 and 40. Secured to each of the spacer pipes as by welding and abutting against the plate members 50 and 52, are a plurality of upstanding support members 54 while similar support members 56 extending upwardly to a height equal to that of the support members 54 are secured as by welding to the plate members 50 and 52 between the spacer pipes.

Figure 7:
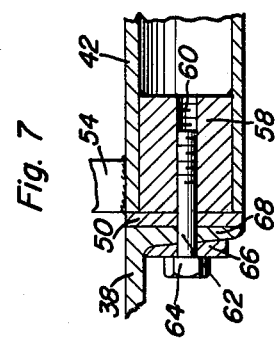
FIGURE 7 is a partial sectional view taken through a plane indicated by section line 7—7 in FIGURE 3.

Referring to FIGURES 4 and 7 in particular, it will be observed that the channel members 38 and 40 which are spaced from the ends of the spacer pipes by the plate members 50 and 52, are connected to the ends of the spacer pipes by end plugs 58 which are welded into the ends of the spacer pipes as illustrated with respect to one end of the spacer pipe 42 in FIGURE 7, said end plugs 58 being provided with threaded bores 60 for receiving a connecting bolt member 62 with the head 64 thereof abutting against a beveled washer member 66 bearing against the inside of the down-turned flange 68 of the channel members. It will be understood of course, that each end of each of the spacer pipes 42, 44, 46, and 48 is connected with the channel members 38 and 40 in a similar fashion.

The upper and lower channel members 38 and 40 rotatably support therebetween a plurality of spaced parallel sizing roller assemblies which are rotated in opposite directions with the spacing therebetween permitting the food products passing thereover to fall downwardly therebetween when the spacing between adjacent sizing rollers exceeds the size of the product. Referring therefore to FIGURE 12 in particular, it will be observed that there are provided a plurality of spaced stationary roller assemblies 70 which are made up of an inner shaft member 72 and an outer tubular roller portion 74 mounted thereon extending along a major portion of the inner shaft member 72 terminating at a point spaced from the lower end of the shaft member 72. The stationary roller assemblies 70, are journaled for rotation about fixed axes by means of bearing assemblies 76 fixed to the upper channel member 38 and lower bearing assemblies 78 fixed to the lower channel member 40. The stationary roller assemblies 70 are therefore rotatably mounted by both the upper and lower channel members with the inner shaft members 72 thereof extending through the bearing assemblies 76 and 78. Drive pulley wheels 80 and 82 are respectively connected to the upper and lower ends of the inner shaft members 72 of the stationary roller assemblies 70 for the purpose of imparting drive to and through the stationary roller assemblies. Rotatably mounted and disposed between the stationary roller assemblies 70 are upper sizing roller assemblies 84 including a roller section 86 extending parallel to and along a section of the stationary roller assemblies 70 with the upper end thereof having an inner shaft member 88 extending through a pair of adjustable spaced bearing assemblies 90 and 92. Also connected to the upper end of the inner shaft members 88 are drive pulley wheels 94. Lower sizing roller assemblies 96 are disposed between the stationary roller assemblies 70 along the lower section of the portions 74 thereof, which lower sizing roller assembly includes an inner shaft member 98 uncovered by the outer roller portion at the lower end of the lower sizing roller assembly so as to provide a wider spacing between the inner shaft member 98 and the inner shaft members 72 of the stationary roller assemblies 70. The inner shaft members 98 of the lower sizing roller assemblies are rotatably mounted by a pair of spaced bearing assemblies 100 and 102 and have connected to the lower ends thereof drive pulley wheels 104. It will therefore be apparent that three different spacings between the stationary roller assemblies 70 are provided by virtue of the upper sizing roller assembly 84 and the lower sizing roller assemblies 96. Also, by mounting all of the spaced bearing assemblies 90 and 92 on a slide assembly slidably mounted on the upper channel member 38, and mounting the lower spaced bearing assemblies 100 and 102 on a slide assembly slidably mounted on the lower channel member 40, the upper and lower sizing roller assemblies may be independently adjusted to vary the spacing between the stationary roller assemblies so as to provide a wide choice of sizes.

Referring now to FIGURES 4, 5 and 6, it will be observed that the fixed bearing assemblies 76 are fixedly mounted on the top of the channel member 38 by means of a pair of bolt members 106 extending through flanges of the bearing assemblies 76 into apertures in the top of the channel member 38 with spacer bushings 108 being provided for spacing the bearing assemblies 76 above the top of the channel member 38. A slide block 110 is also provided below the fixed bearing assemblies 76 for purposes as will hereafter be explained. Also provided is a water shield plate 112 connected to the bottom of the fixed bearing assemblies 76 by the bolt members 106 as more clearly seen in FIGURE 5. It will be understood of course, that a similar mounting is provided for the fixed bearing assemblies 78 on the lower channel member 40.

Figure 8:
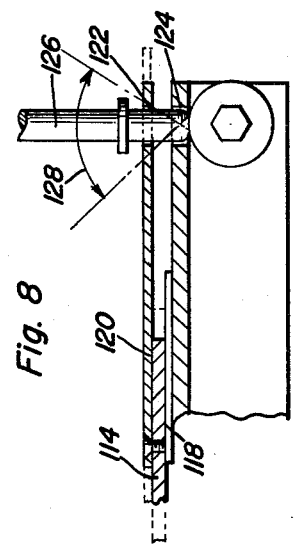
FIGURE 8 is a partial sectional view taken through one end of a slide assembly and main frame portion illustrating the adjustment mechanism for the slide assembly.

In order to adjustably mount the respective spaced bearing assemblies on the upper and lower channel members, a pair of slide assemblies 114 are provided on the respective channel members 38 and 40 as shown in FIGURE 13. The slide assemblies 114 are slidably confined to the top of the channel members by means of the slide blocks 110 fixed to the bottom of each of the fixed bearing assemblies which extend through and cooperate with the sides of a plurality of slots 116 which are provided for in the slide assemblies 114. Accordingly, the slide assemblies 114 may be slidably displaced along the channel members relative to the fixed bearing assemblies 76 and 78. The slide assemblies therefore have securely bolted thereto the spaced bearing assemblies 90 and 92 on the channel member 38 while the slide assembly carries the adjustable bearing assemblies 100 and 102 on the lower channel member 40 as more clearly seen in FIGURE 4. Nylon wear strips 118 are therefore fixed to the top of the channel members 38 and 40 so that the slide assemblies 114 may slide with respect thereto without any metal-to-metal contact and eliminating the need for lubrication. It will therefore be apparent that the adjustment of the upper and lower sizing roller assemblies may be effected as hereinbefore indicated by slidable displacement of the sliding assemblies 114. In order to effect such adjustment, each slide assembly 114 has connected thereto at one lateral end a slide extension 120 as more clearly seen in FIGURES 8 and 13. Also provided in the slide extension 120 is an aperture 122 aligned with an aperture 124 in the top of the channel member with which the particular slide assembly 114 is associated. An adjustment tool handle member 126 may therefore be inserted through the aligned apertures 122 and 124 and angularly displaced as indicated by the arrow 128 in FIGURE 8 in order to slidably displace in either direction, the slide assembly 114 with respect to the top of the channel member.

Figure 2:
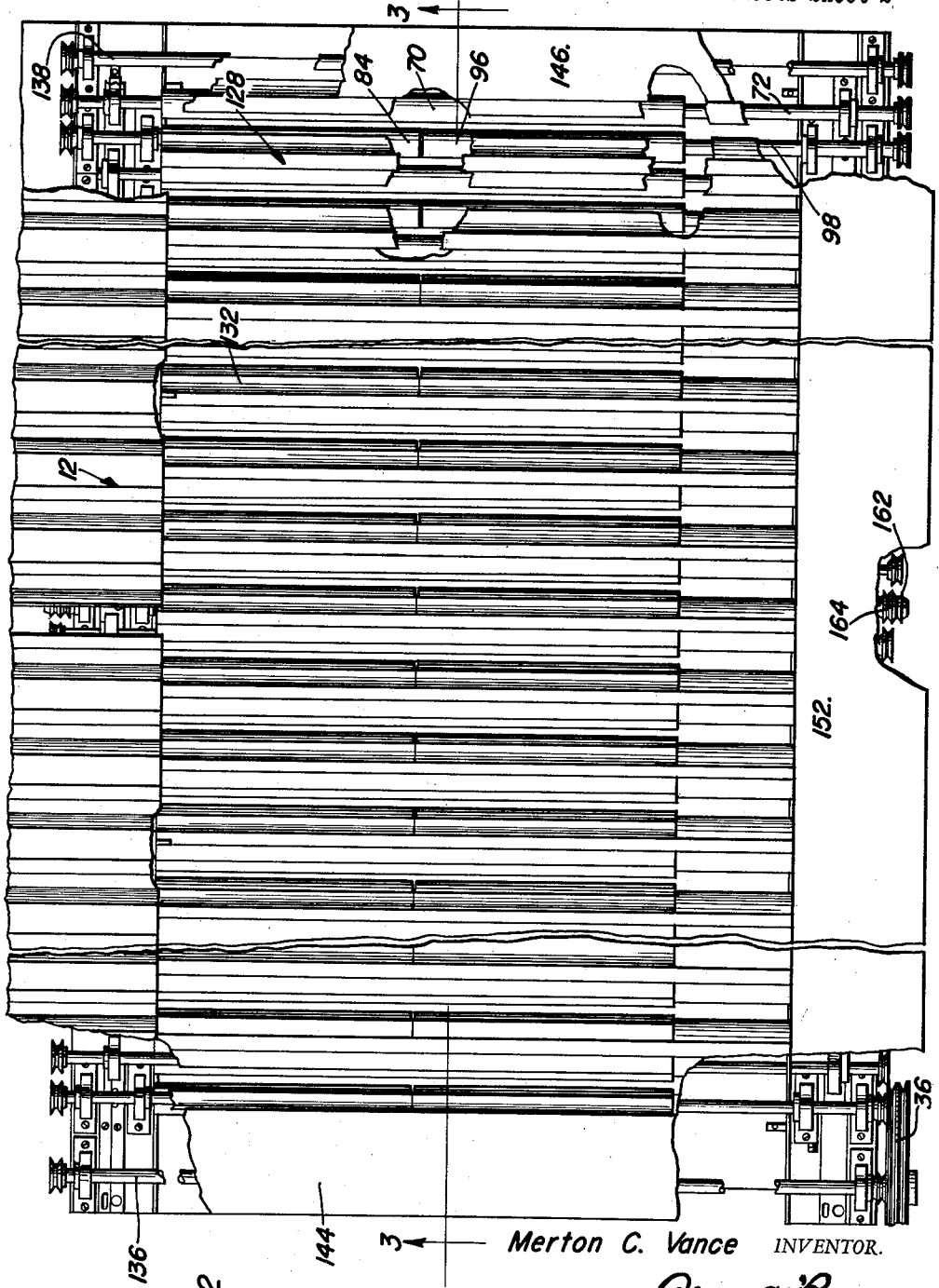
FIGURE 2 is a top plan view with parts broken away of the sizing machine illustrated in FIGURE 1.
Figure 3:
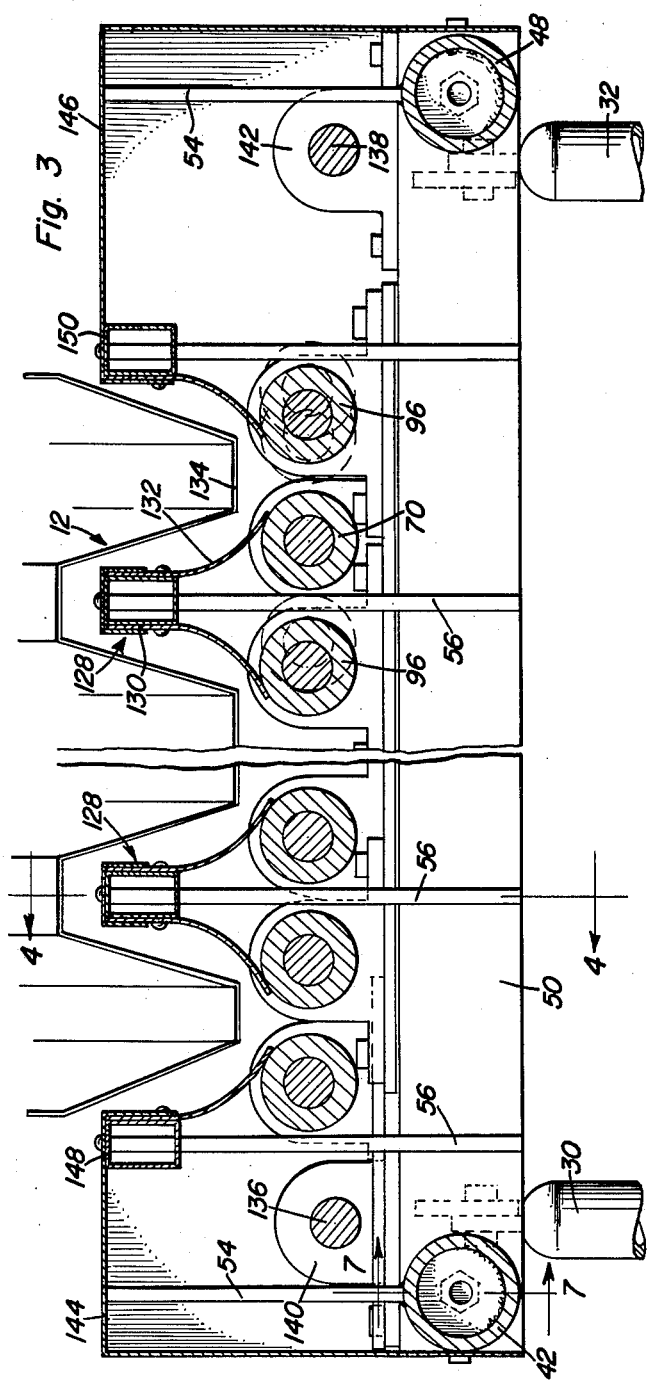
FIGURE 3 is a sectional view taken substantially through a plane indicated by section line 3—3 in FIGURE 2.

Referring now to FIGURES 2 and 3, it will be observed that a plurality of product guide assemblies generally referred to by reference numeral 128 are supported by the upstanding arms 56 which are welded to the plate members 50 and 52 mounted on the inside of the channel members 38 and 40 as hereinbefore described. The product guide assemblies 128 extend therefore between the channel members 38 and 40 and are disposed above the sizing roller assemblies. As more clearly seen in FIGURE 3, the assemblies 128 are disposed between and above the stationary roller assemblies 70 and the adjustable roller assemblies 84 or 96. The guide assemblies 128 include a frame member 130 mounted on top of the arm members 56 and have connected thereto a pair of downwardly depending flexible wiper members 132 which wipingly engage the tops of the associated roller assemblies 70 and 96 as illustrated in FIGURE 3 or the stationary roller assemblies 70 and adjustable roller assemblies 84. It will also be observed that the assemblies 128 are disposed between alternate roller assemblies so that the adjacent flexible side walls 132 of adjacent assemblies 128 define therebetween an open channel which is in registry with delivery channels 134 of the shaker and divider mechanism 12 with which the sizing machine is associated. Accordingly, the food products delivered from the shaker and divider mechanism 12 move down the incline defined by the main supporting frame assembly 14 for the roller assemblies between adjacent stationary roller assemblies 70 and the upper and lower adjustable sizing roller assemblies 84 and 96. It will therefore be apparent that the spacing between the upper sizing roller assembly 84 and the stationary roller assembly 70 will permit only the small products to fall therebetween, while a medium size product will fall between the adjustable sizing roller 96 and the stationary roller 70. The larger sizes of the food products will fall between the inner shaft portions 72 and 98 of the stationary roller assemblies 70 and the adjustable roller assemblies 96. The product guide assemblies 128 will accordingly guide the products between alternate roller assemblies so that the sides of the opposite roller assemblies moving in an upward direction may be engaged by the food products. It will also be observed from FIGURES 2 and 3, that drive and idler shafts 136 and 138 are rotatably mounted at opposite sides of the sizing machine by means of bearing assemblies 140 and 142. Side apron members 144 and 146 enclose the drive and idler shaft members 136 and 138, said apron members 144 and 146 being connected to end product guide assemblies 148 and 150 respectively. The apron members 144 and 146 are supported by and connected to the support arm members 54 connected to the spacer pipe members 42 and 48. Similar apron constructions are provided and enclose the intermediate spacer pipe members 44 and 46. It will be apparent, that the channels defined by the flexible wiper walls 132 of the guide assemblies 128 do maintain the roller assemblies clean and by virtue of their flexibility will accommodate the lateral and independent adjustments of the upper and lower sizing roller assemblies 84 and 96.

The drive assemblies for oppositely rotating the sizing roller assemblies as hereinbefore indicated, include the drive pulley wheels connected to the ends of the roller assemblies. The drive assemblies are disposed at the upper end below the outlet end of the shaker and divider mechanism 12 while an enclosing casing member 152 is provided therefor at the lower end of the sizing machine.

Referring to FIGURE 9, it will be observed that the lower end of the drive assembly includes the alternate arrangement of the fixed axes pulley wheels 82 and the simultaneously adjustable axes pulley wheels 104 which are rotated in opposite directions. An endless belt 154 is therefore trained about the pulley wheels 82 and 104 for rotation thereof in opposite directions and is also trained about at one end a pulley wheel 156 fixed to the lower end of the idler shaft 138. The belt 154 then proceeds about a fixed idler pulley wheel 158 rotatably mounted by the lower channel member 40 and also about a belt tensioning idler pulley 160. The belt 154 then proceeds from the tensioning pulley 160 to an outer sheave 162 of a double pulley also having an inner sheave 164 as more clearly seen in FIGURES 2 and 4. It will therefore be apparent from FIGURE 2, that the pulley wheels 82 and 104 disposed to the right of the centrally disposed double pulley wheel 162—164 are aligned with the pulley sheave 162 for driving interconnection by the endless belt 154. The pulley wheels 82 and 104 disposed to the left of the central pulley wheel are aligned with the inner sheave portion 164 thereof so that a second endless belt 166 may be trained about the other pulley wheels 82 and 104 and about the inner pulley sheave 164. A similar belt tensioning pulley 160 and idler pulley 158 are provided for the endless belt 166 which is also entrained about an idler pulley wheel 168 connected to the shaft 136. As more clearly seen from FIGURE 2, the shaft 136 constitutes the drive shaft to which the drive pulley 36 is connected for driving connection to the motor 24 by the endless drive belt mechanism 28. Accordingly, the drive pulley 36 imparts drive through belts 166 and 154 to all of the pulleys at the lower end of the frame assembly 14 and also imparts drive to the pulley wheels disposed at the upper end of the frame assembly 14 by a similar drive arrangement as described with respect to the lower end. In order to maintain the belts 154 and 166 under the proper and constant tension required, a belt tensioning mechanism is provided which includes a bracket mount 170 as more clearly seen from FIGURES 10 and 11 through which a belt tensioning adjusting bolt 172 extends. Mounted on the bolt 172 is a rubber bushing element 174 which may be rotatably locked at any adjusted angular position between the downwardly depending arms of the mount 170 by means of the lock-washers 176 after tightening of the bolt nut 178. Fixed to the rubber bushing element 174 is a sleeve 180 to which a belt tightener arm 182 is connected, which arm 182 rotatably mounts at its outer end the belt tensioning pulley 160. It will therefore be apparent that the angular position of the belt tightener arm 182 may be adjusted by loosening of the nut 178 and retightening thereof in the desired angular position thereof. The torsion rubber element 174 will thereby provide the proper tensioning force on the belt 154 or 166 which engages the tensioning pulley wheels 160.

From the foregoing description, operation and utility of the sizing machine of the present invention will be apparent. As will be recalled therefore, food products entering the sizing machine 10 from the outlet end of the divider and shaker mechanism 12 fall between the channels formed by the flexible side walls 132 of the guide assemblies 128 which are mounted above and parallel to the inclined sizing roller assemblies rotatably mounted on the inclined main frame 14. As the products move down the incline, they are tumbled by means of the oppositely rotating and upwardly exposed sides of the sizing rollers which are spaced apart different distances along the lengths thereof so that the products will fall through in accordance with their sizes onto the delivery conveyors 18, 20 and 22 which deliver small, medium and large products respectively. The product sizes may be varied with ease and convenience and with a greater degree of flexibility by virtue of the provision of fixed or stationary roller assemblies 70 disposed in cooperative relation to upper roller assemblies 84 which are rotatably mounted by spaced bearings slidably displaceable with respect to the fixed roller assemblies for varying the spacing therebetween. Lower sizing roller assemblies 96 are independently slidably adjustable for providing a different spacing between the lower sizing roller assemblies and the stationary roller assemblies along two separate portions thereof defining the medium and large size products. The drive for the roller assemblies is transmitted to both the upper and lower ends of the roller assemblies through pairs of endless belts which drivingly interconnect the roller assemblies by pulley wheels connected to the upper and lower ends thereof, said belt mechanisms being constantly and properly tensioned by belt tighteners.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sizing machine for fruit, vegetables or the like comprising, inclined frame means rotatably mounting a plurality of fixed rollers in parallel spaced relation to each other between an upper and lower end of the frame means, a set of upper sizing rollers rotatably mounted and supported solely at the upper end of the frame means and adjustably disposed between the fixed rollers along a section thereof to define small size spacing therebetween, a second set of lower sizing rollers rotatably mounted and supported solely at the lower end of the frame means having large and small diameter sections and adjustably disposed between and along the fixed rollers to define medium and large size spacing respectively, each of said sets being adjustable independently of the other, adjustable plate means slidably mounted at the upper and lower ends of the frame means for separately rotatably mounting the upper and lower sizing rollers in adjustable relation to the fixed rollers, and separate size delivery means mounted by the frame means below the respective upper sizing rollers, large diameter sections of the lower rollers and small diameter sections of the lower rollers, to receive sized items that fall between the small, medium and large size spacings.

2. A sizing machine for fruit, vegetables or the like comprising, inclined frame means rotatably mounting a plurality of fixed rollers in parallel spaced relation to each other between an upper and lower end of the frame means, a set of upper sizing rollers rotatably mounted and supported solely at the upper end of the frame means and adjustably disposed between the fixed rollers along a section thereof to define small size spacing therebetween, and a second set of lower sizing rollers rotatably mounted and supported solely at the lower end of the frame means having large and small diameter sections and adjustably disposed between and along the fixed rollers to define medium and large size spacing respectively, each of said sets of rollers being adjustable relative to the fixed rollers independently of the other.

3. A sizing machine for fruit, vegetables or the like comprising, inclined frame means rotatably mounting a plurality of fixed rollers in parallel spaced relation to each other between an upper and lower end of the frame means, a set of upper sizing rollers rotatably mounted at the upper end of the frame means and adjustably disposed between the fixed rollers along a section thereof to define a small size spacing therebetween, a second set of lower sizing rollers rotatably mounted at the lower end of the frame means having large and small diameter sections and adjustably disposed between and along the fixed rollers to define medium and large size spacing respectively, adjustable plate means slidably mounted at the upper and lower ends of the frame means for separately rotatably mounting the upper and lower sizing rollers in adjustable relation to the fixed rollers, separate size delivery means mounted by the frame means below the respective upper sizing rollers, large diameter sections of the lower rollers and small diameter sections of the lower rollers, to receive sized items that fall between the small, medium and large size spacings, open channel defining means mounted by the frame means above the rollers including pairs of flexible side walls wipingly engageable with the roller means and rigidly interconnected above and between alternate pairs of fixed rollers and upper and lower rollers, fixed journal means fixedly mounted at the upper and lower ends of the frame means for rotatably mounting the fixed rollers therebetween, spaced journal means mounted on the adjustable plate means on opposite sides of and laterally between the fixed journal means for respectively rotatably mounting the upper and lower rollers therefrom, said spaced journal means constituting the sole mounting means for said upper and lower rollers, slot means formed in the plate means through which the fixed journal means extend for accommodating adjustment shifting of the plate means relative to the fixed journal means, means for adjustably shifting the plate means relative to the frame means, and a drive assembly comprising flexible drive means drivingly interconnecting the rollers for rotation of the fixed rollers and sizing rollers in opposite directions and permitting adjustment of the sizing rollers during rotation thereof, said drive assembly including drive pulley wheels secured to the mounted ends of said fixed and adjustable rollers, a roller centrally located at both the upper and lower end of the frame means, said last mentioned roller having a double pulley, idler pulley wheels rotatably mounted at the upper and lower ends on opposite sides of the sizing machine, belt tensioning idler pulleys mounted between the double pulley and the idler pulleys on opposite sides of the upper and lower ends of said machine, a first pair of endless belts trained about the drive pulley wheels, the idler pulleys, and the tensioning pulleys on one side of said machine, said belts also being trained about the outer sheaves of the double pulleys, and, a second pair of endless belts similarly trained about the pulleys on the other side of said machine and the inner sheaves of said double pulleys.

4. A sizing machine for fruit, vegetables or the like comprising, inclined frame means rotatably mounting a plurality of fixed rollers in parallel spaced relation to each other between an upper and lower end of the frame means, a set of upper sizing rollers rotatably mounted at the upper end of the frame means and adjustably disposed between the fixed rollers along a section thereof to define small size spacing therebetween, a second set of lower sizing rollers rotatably mounted at the lower end of the frame means having large and small diameter sections and adjustably disposed between and along the fixed rollers to define medium and large size spacing respectively, adjustable plate means slidably mounted at the upper and lower ends of the frame means for separately rotatably mounting the upper and lower sizing rollers in adjustable relation to the fixed rollers, and separate size delivery means mounted by the frame means below the respective upper sizing rollers, large diameter sections of the lower rollers and small diameter sections of the lower rollers, to receive sized items that fall between the small, medium and large size spacings, and a drive assembly comprising flexible drive means drivingly interconnecting the rollers for rotation of the fixed rollers and sizing rollers in opposite directions and permitting adjustment of the sizing rollers during rotation thereof, said drive assembly including drive pulley wheels secured to the mounted ends of said fixed and adjustable rollers, a roller centrally located at both the upper and lower end of the frame means, said last mentioned roller having a double pulley, idler pulley wheels rotatably mounted at the upper and lower ends on opposite sides of the sizing machine, belt tensioning idler pulleys mounted between the double pulley and the idler pulleys on opposite sides of the upper and lower ends of said machine, a first pair of endless belts trained about the drive pulley wheels, the idler pulleys, and the tensioning pulleys on one side of said machine, said belts also being trained about the outer sheaves of the double pulleys, and, a second pair of endless belts similarly trained about the pulleys on the other side of said machine and the inner sheaves of said double pulleys.

5. A sizing machine for fruit, vegetables or the like comprising inclined frame means rotatably mounting a plurality of fixed rollers in parallel spaced relation to each other between an upper and lower end of the frame means, a set of upper sizing rollers rotatably mounted at the upper end of the frame means and adjustably disposed between the fixed rollers along a section thereof to define small size spacing therebetween, a second set of lower sizing rollers rotatably mounted at the lower end of the frame means having large and small diameter sections and being adjustably disposed between and along the fixed rollers to define medium and large size spacing respectively, elongated adjustable plates slidably mounted at the upper and lower ends of the frame means, slots formed in the elongated plates, fixed journals fixedly mounted at the upper and lower ends of the frame means for rotatably mounting the fixed rollers therebetween, said fixed journals extending through the slots for accommodating adjustment shifting of the elongated adjustable plates relative to the fixed journals, and pairs of spaced journals mounted on the adjustable plates on opposite sides of and laterally between the fixed journals, said upper and lower rollers each having the outer end thereof rotatably mounted by one of said pairs of spaced journals, this mounting of the outer end of each of the upper and lower rollers constituting the sole means of mounting these rollers.

References Cited in the file of this patent

UNITED STATES PATENTS

| | | |
|---|---|---|
| 1,026,327 | Martin | May 14, 1912 |
| 1,090,817 | Knoerzer | Mar. 17, 1914 |
| 2,786,574 | Clark | Mar. 26, 1957 |
| 2,937,765 | Shank | May 24, 1960 |
| 2,989,180 | Merrick | June 20, 1961 |

FOREIGN PATENTS

| | | |
|---|---|---|
| 17,540 | Sweden | Dec. 21, 1901 |